US007936923B2

(12) United States Patent
Liu et al.

(10) Patent No.: US 7,936,923 B2
(45) Date of Patent: May 3, 2011

(54) IMAGE BACKGROUND SUPPRESSION

(75) Inventors: Che-Bin Liu, Milpitas, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 900 days.

(21) Appl. No.: 11/848,907

(22) Filed: Aug. 31, 2007

(65) Prior Publication Data

US 2009/0060331 A1 Mar. 5, 2009

(51) Int. Cl.
*G06K 9/34* (2006.01)

(52) U.S. Cl. ........................................ 382/173; 382/199

(58) Field of Classification Search .................. 382/162, 382/173, 199, 232, 235, 284; 358/1.9, 2.1, 358/3.27, 464

See application file for complete search history.

(56) References Cited

U.S. PATENT DOCUMENTS

| | | | | |
|---|---|---|---|---|
| 6,148,102 | A | 11/2000 | Stolin | |
| 6,731,800 | B1 * | 5/2004 | Barthel et al. | 382/176 |
| 6,909,803 | B2 | 6/2005 | Uchida | |
| 7,027,647 | B2 * | 4/2006 | Mukherjee et al. | 382/173 |
| 7,043,080 | B1 | 5/2006 | Dolan | |
| 7,061,492 | B2 | 6/2006 | Carrai et al. | |
| 7,130,461 | B2 | 10/2006 | Rosenholtz | |
| 7,133,565 | B2 | 11/2006 | Toda et al. | |
| 7,557,963 | B2 * | 7/2009 | Bhattacharjya | 358/3.27 |
| 2005/0002566 | A1 | 1/2005 | Di Federico et al. | |

* cited by examiner

*Primary Examiner* — Duy M Dang

(74) *Attorney, Agent, or Firm* — Michael T. Gabrik

(57) ABSTRACT

Disclosed are embodiments of systems and methods for suppressing the background of an image. In embodiments, the number of foreground pixels or background pixels within a neighborhood of an identified background pixel may be compared against an aggressiveness threshold. Responsive to the number of foreground pixels within a neighborhood of an identified background pixel not exceeding an aggressiveness threshold, the color of the identified background pixel may be changed to an average local background color. Alternatively, responsive to the number of background pixels within a neighborhood of an identified background pixel exceeding an aggressiveness threshold, the color of the identified background pixel may be changed to an average local background color. In embodiments, additional processes may be performed on the image including, but not limited to, color adjusting, filtering, image enhancing, compression, format conversion, watermarking, special effects, video editing, etc.

20 Claims, 11 Drawing Sheets

400

Find background color of the document as the white point ⟿ 405

↓

Initialize a color profile with the white point ⟿ 410

↓

Perform color matching using the initialized color profile ⟿ 415

800

Original Image

900

Foreground Mask

1000

Processed image without Suppressed Background

1100

Processed image with Suppressed Background

IMAGE BACKGROUND SUPPRESSION

BACKGROUND

A. Technical Field

The present invention pertains generally to image processing, and relates more particularly to image processing that allows for the suppression of background around foreground segments of an image. The present invention may be incorporated into systems and methods.

B. Background of the Invention

A digital image typically comprises an array of picture elements. Each picture element, also known as a "pixel," has a value and a location within the array. The value represents either the intensity of the pixel (if in grayscale) or the color of the pixel. At a higher level, pixels may be segmented into two or more groups. For example, pixels of an image may be classified into foreground and background layers or segments.

When processing a digital image, it can be beneficial to differentiate the pixels into different segments. Certain segments of the image may be of more interest than other segments, may be beneficially affected by image processing procedures, or may be adversely affected by image processing procedures. By dividing an image into different segments, one segment may be processed differently than another segment.

For example, one application of segmentation is document compression. Although compression methods help reduce file sizes, the compressed files are typically not without problems. Conventional image compression approaches that compress an entire image generally lead to unsatisfactory results in reconstructed image quality and compressed file size. When a high compression ratio is used, the compressed images may show disturbing artifacts, such as blurred text and blurred color boundaries. To obtain a high-quality compressed image, the compression ratio may need to be set very low, but the resulting file size will therefore not be substantially reduced. Thus, neither approach is particularly satisfactory. By segmenting an image into foreground and background regions, the foreground may be compressed at a different level than the background.

SUMMARY OF THE INVENTION

Disclosed are embodiments of systems and methods for suppressing the background of an image. In embodiments, the number of foreground pixels or background pixels within a neighborhood of an identified background pixel may be compared against an aggressiveness threshold. Responsive to the number of foreground pixels within a neighborhood of an identified background pixel not exceeding an aggressiveness threshold, the color of the identified background pixel may be changed to an average local background color. Alternatively, responsive to the number of background pixels within a neighborhood of an identified background pixel exceeding an aggressiveness threshold, the color of the identified background pixel may be changed to an average local background color. In embodiments, additional processes may be performed on the image including, but not limited to, color adjusting, filtering, image enhancing, compression, format conversion, watermarking, special effects, video editing, etc.

In embodiments, a method for suppressing background pixels of an image may comprise identifying background pixels within a first distance from a foreground pixel and, for an identified background pixel, changing the identified background pixel's color to an average local background color responsive to a number of background pixels within a first neighborhood of the identified background pixel being greater than a threshold percentage multiplied by a total number of pixels in the first neighborhood.

In embodiments, the average local background color is obtained by computing an average color of background pixels that are not background pixels within the first distance from a foreground pixel and are background pixels within a second neighborhood of the identified background pixel.

In embodiments, the first and second neighborhoods may be the same or different.

In embodiments, the method may also include color adjusting the image responsive to the image being a non-color-adjusted image. In embodiments, the process of color adjusting the image may comprises the steps of: identifying a background color of the image as a white point; initializing a color profile with the white point; and performing color matching for at least some of the pixel in the image using the color profile.

In embodiments, one or more post-processing operations may be applied to at least some of the foreground and background pixels. For example, the segmented image may be compressed. In embodiments, the compressed image may be in a portable format document.

In embodiments, aspects of the present invention may comprise a medium or waveform comprising one or more sequences of instructions to direct an instruction-executing device to perform one or more of the methods disclosed herein.

In embodiments, a system for suppressing background of an image may comprise a background suppressor that identifies at least some of the background pixels within a first distance from a foreground pixel in the image, and that, for an identified background pixel, changes the identified background pixel's color to an average local background color responsive to a number of foreground pixels within a first neighborhood of the identified background pixel being less than a threshold percentage multiplied by a total number of pixels in the first neighborhood.

In embodiments, the background suppressor may obtain the average local background color by computing an average color of background pixels that are not background pixels within the first distance from the foreground mask and are background pixels within a second neighborhood of the identified background pixel.

In embodiments, the system may further comprise a segmenter that assigns a foreground or a background label to at least some of the pixels; a color adjustor that color adjusts the image responsive to the image being a non-color-adjusted image; and/or a post processor that applies one or more post-processing operations to at least some of the foreground and background pixels. In an embodiment, the post processor may comprise a layer-based compression module that compresses at least one of foreground pixels and background pixels.

It should be noted that the teachings of the present invention may be implemented in any device or system that is capable of processing a digital image, included but not limited to computers, multimedia devices, scanners, printers, copiers, cameras, facsimile machine, multifunction devices, and the like.

Aspects of the present invention may be implemented in a wide variety of ways including software, hardware, firmware, or combinations thereof. For example, the functions to practice various aspects of the present invention may be performed by components that are implemented in a wide variety of ways, including discrete logic components, one or more application specific integrated circuits (ASICs), and/or a program or programs of instructions for execution by one or more program-controlled processors. It shall be noted that the manner in which the present invention is implemented is not critical.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
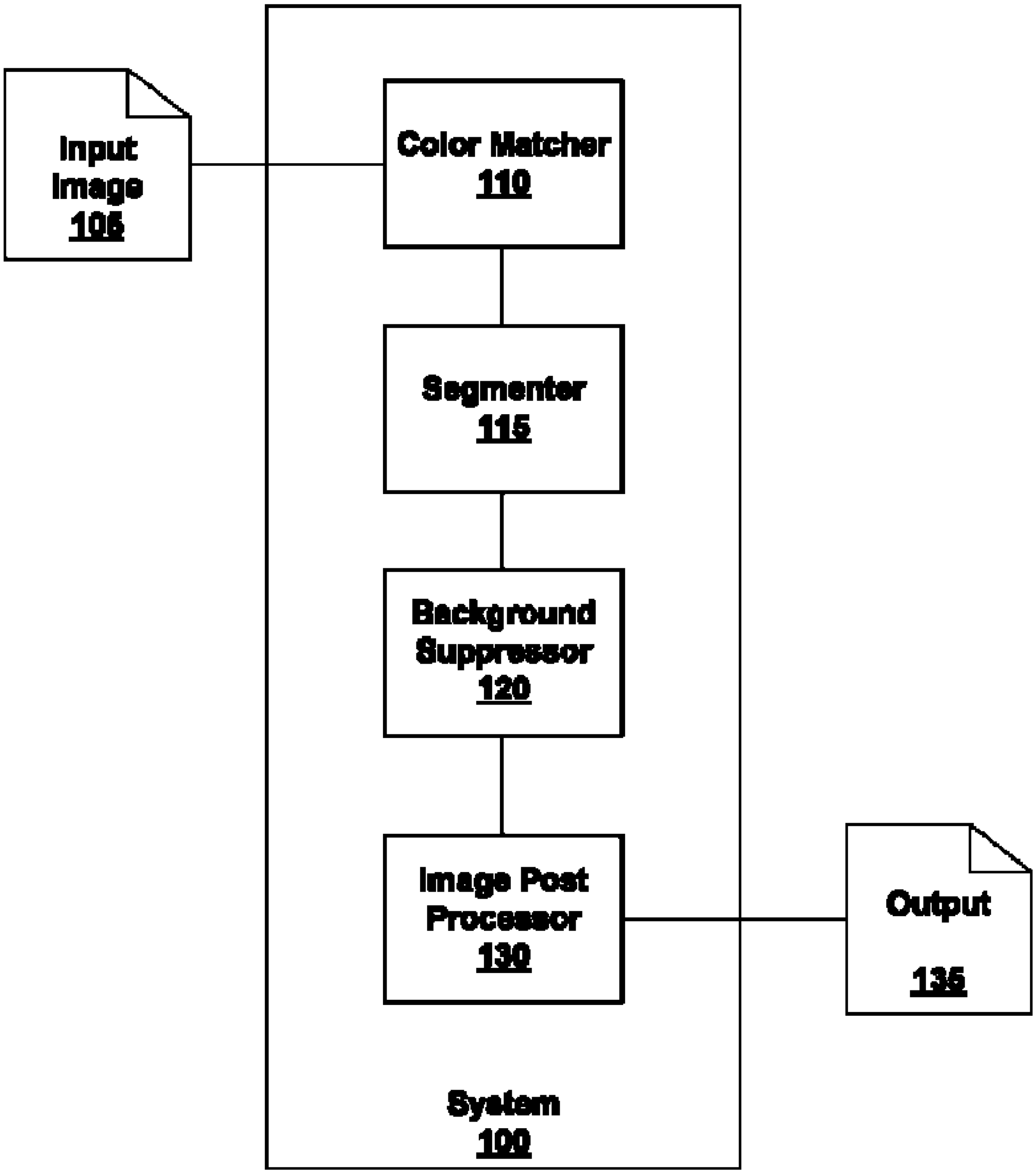
FIG. 1 depicts a system for suppressing the background of an image according to embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including camera, scanners, printers, computers, facsimile machine, mobile devices, including those devices with a display or camera capabilities, multimedia devices, multifunction devices (such as, for example, a multifunction printer and scanner), and the like. The embodiments of the present invention may be implemented in software, hardware, firmware, or combinations thereof. Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrating within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily referring to the same embodiment.

It should be noted that the examples illustrated herein deal with images with light background and darker foreground. The examples are provided by way of explanation and not limitation. One skilled in the art shall recognize that the systems and methods discussed herein may be applied to or adapted for images with dark background and lighter foreground. For example, in an embodiment, the present system and methods may negate the color of the image and process the image using the same or similar methods as disclosed herein. In embodiments, the present systems and methods may determine, for an image or a section of an image, whether it is a light background/darker foreground or dark background/lighter foreground image.

Disclosed herein are systems and methods for processing an image. In embodiments, an image may be segmented into background and foreground layers and the background layer may be suppressed to improve the appearance of the image.

In certain documents, such as printed documents, anti-aliasing techniques can be applied to make certain foreground content, such as text, look smooth. However, for content-based compression, it is preferable to label exact text boundary when separating an image into foreground or background layers. During the labeling processing, pixels resulting from anti-aliasing, noise, and/or other image artifacts may be labeled as background. The number of these pixels may be increased if the labeled text is required to be thin. Since the colors of these pixels are not background colors, typical segmentation/labeling usually introduces undesired yellowish or grayish effect around text after compression.

When only text items exist in the document, minimizing undesired yellowish or grayish effect around text is easier to address. However, minimizing this undesired yellowish or grayish effect is more complex when images are also present in the document because grayish or yellowish effects may be desired around image objects. Furthermore, sharp boundaries tend to make images look unnatural.

Application of the present invention results in suppressed colors of background pixels, yet may be used for documents with not just text but with one or more object types, such as text, images, graphics, line art, or the like. In embodiments, the level of suppression may be adjusted. For example, in an embodiment, a text mode, for documents that are exclusively or predominantly text, may be selected. Alternatively, a photo mode, for documents that contain photos, may be selected. One skilled in the art shall recognize that other modes may be used.

A. System Embodiments

FIG. 1 depicts a system 100 for suppressing the background of an image according to an embodiment of the invention. As illustrated in the embodiment depicted in FIG. 1, image processing system 100 may comprise a color matcher 110, a segmenter or pixel labeler 115, a background suppressor 120, and an image post processor 130. Each of the components within the system will be described in greater detail below.

As depicted in FIG. 1, a digital image or document 105 may be provided to the system 100. Because the present invention may operate on a portion of an input image, it shall be understood that input image 105 may be construed to be the entire image or a portion of an image. In embodiments, the input image 105 may be an image obtained from a scanner, camera, copier, facsimile machine, multifunction machine, or the like. In embodiments, the image or document 105 may be a digitally generated image. A "document" shall be construed to mean a digital file, the data that comprises the document (or a portion thereof), including without limitation pixel values, or the display of the digital file, which may be displayed electronically (such as on a computer screen) or displayed on a physical medium (such as a printed paper). As used herein, the terms "image" and "document" may be used interchangeably.

It shall be noted that the present invention may be implemented in any computing/instruction-executing device or system capable of processing image data, including without limitation, a general-purpose computer and a specific computer, such as one intended for graphics processing. The present invention may also be implemented into other computing devices and systems, including without limitation, a digital camera, a printer, a scanner, a printer, a facsimile machine, a multimedia device, multifunction device (such as a multifunction printer/scanner), and any other device that processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 2:
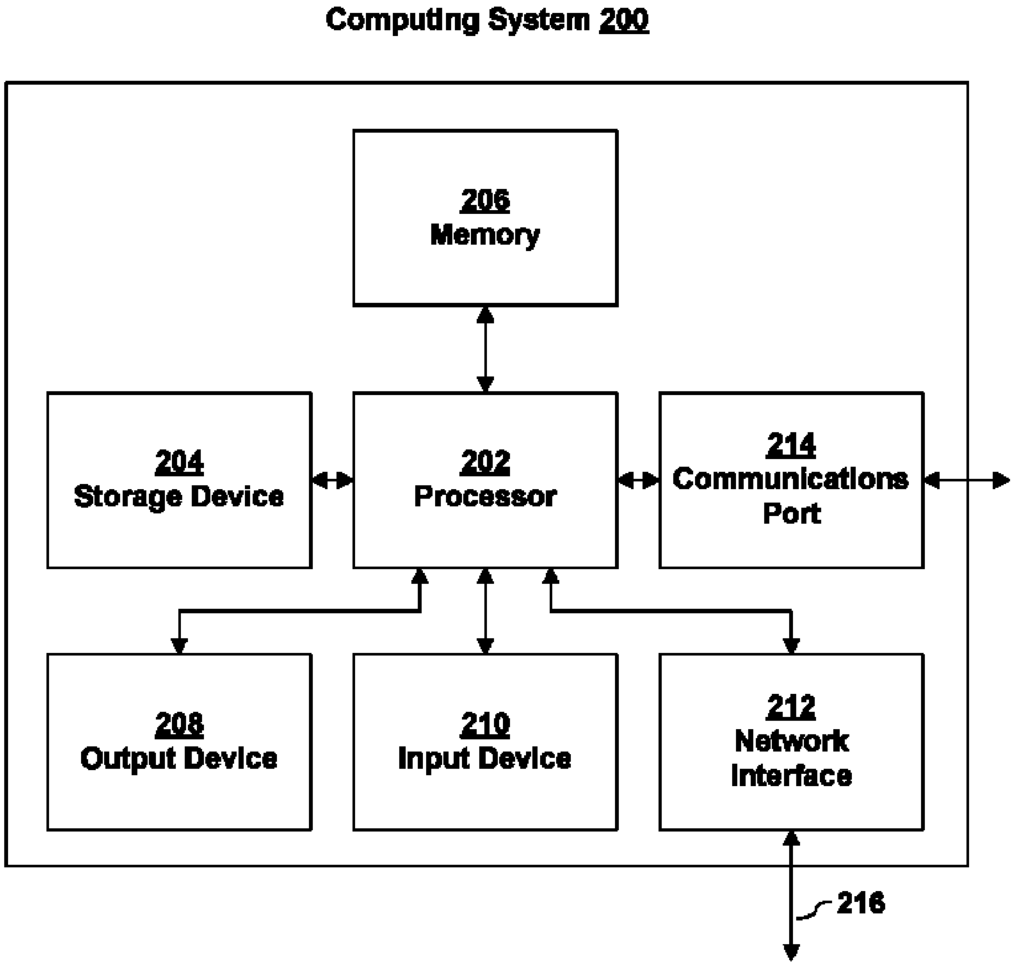
FIG. 2 illustrates a computing device or system according to embodiments of the invention.

FIG. 2 depicts a functional block diagram of an embodiment of an instruction-execution/computing device 200 that may implement or embody embodiments of the present invention. As illustrated in FIG. 2, a processor 202 executes software instructions and interacts with other system components. In an embodiment, processor 202 may be a general purpose processor such as an AMD processor, an INTEL processor, a SUN MICROSYSTEMS SPARC, or a POWERPC compatible-CPU, or the processor may be an application specific processor or processors. A storage device 204, coupled to processor 202, provides long-term storage of data and software programs. Storage device 204 may be a hard disk drive and/or another device capable of storing data, such as a computer-readable media (e.g., diskettes, tapes, compact disk, DVD, and the like) drive or a solid-state memory device. Storage device 204 may hold programs, instructions, and/or data for use with processor 202. In an embodiment, programs or instructions stored on or loaded from storage device 204 may be loaded into memory 206 and executed by processor 202. In an embodiment, storage device 204 holds programs or instructions for implementing an operating system on processor 202. In one embodiment, possible operating systems include, but are not limited to, UNIX, AIX, LINUX, Microsoft Windows, and the Apple MAC OS. In embodiments, the operating system executes on, and controls the operation of, the computing system 200.

An addressable memory 206, coupled to processor 202, may be used to store data and software instructions to be executed by processor 202. Memory 206 may be, for example, firmware, read only memory (ROM), flash memory, non-volatile random access memory (NVRAM), random access memory (RAM), or any combination thereof. In one embodiment, memory 206 stores a number of software objects, otherwise known as services, utilities, or modules. One skilled in the art will also recognize that storage 204 and memory 206 may be the same items and function in both capacities. In embodiments, one or more of the components of FIG. 1 may be modules stored in memory 204, 206 and executed by processor 202.

In an embodiment, computing system 200 provides the ability to communicate with other devices, other networks, or both. Computing system 200 may include one or more network interfaces or adapters 212, 214 to communicatively couple computing system 200 to other networks and devices. For example, computing system 200 may include a network interface 212, a communications port 214, or both, each of which are communicatively coupled to processor 202, and which may be used to couple computing system 200 to other computer systems, networks, and devices.

In embodiments, computing system 200 may include one or more output devices 208, coupled to processor 202, to facilitate displaying graphics and text. Output devices 208 may include, but are not limited to, a display, LCD screen, CRT monitor, printer, touch screen, or other device for displaying information. Computing system 200 may also include a graphics adapter (not shown) to assist in displaying information or images on output device 208.

One or more input devices 210, coupled to processor 202, may be used to facilitate user input. Input device 210 may include, but are not limited to, a pointing device, such as a mouse, trackball, or touchpad, and may also include a keyboard or keypad to input data or instructions into computing system 200.

In embodiments, computing system 200 may receive input, whether through communications port 214, network interface 216, stored data in memory 204/206, or through an input device 210, from a scanner, copier, facsimile machine, or other computing device. It should be noted that system 200 may be a scanner, copier, facsimile machine, multifunction device, or other device and may include more, few, or different components.

One skilled in the art will recognize no computing system is critical to the practice of the present invention. One skilled in the art will also recognize that a number of the elements described above may be physically and/or functionally separated into sub-modules or combined together.

1. Color Matcher

Returning to FIG. 1, in embodiments, color matcher 110 receives an input image 105 and adjusts its color. Color adjustment can be beneficial for a number of reasons, including but not limited to, adjusting the image to better match the original image, to improve the appearance of the displayed image, and to adjust it for an intended display device.

In embodiments, color matcher 110 may enhance the image colors and suppressing the background. For example, the input image may be a scanned image. Because scanned images are usually darker than their corresponding original images, the colors in a scanned image may be corrected to more closely represent the colors in the original image. Furthermore, the background of the scanned image may have a color other than white and that background color may be suppressed in order to improve contrast. For example, the paper of a document may have a color other than true white. Color matcher 110 may adjust the color to a more desired or aesthetically pleasing color, such as white.

In embodiments, one or more types of color adjustment may be used in performing color matching. One type of adjustment may be a "white point" adjustment, which may be used to adjust a color range supported by a device, such as a scanner. In one example, an original image may cover a grayscale range from 0 to 255, but a scanner may only support a grayscale range from 15 to 200. In an embodiment, a white point adjustment may map the lightest color produced by a scanner to white (255), and the darkest color produced by a scanner may be mapped to black (0). Using the white point adjustment, a scanned image may be corrected to be a more accurate representation of the range of colors in the original image. Another type of color adjustment may be a color matching table/transform that maps a spectrum of colors produced by a device, such as a scanner, to a spectrum of true colors that may be present in an original image. In embodiments, device dependent color calibration tables may be provided by device manufacturers. In alternative embodiments, one or more default color calibration tables may be used. In other alternative embodiments, no color matching table may be available, but methods known to those skilled in the art may be used to dynamically construct a color matching table/transform such as, for example, using a white point adjustment. In embodiments, color matcher 110 may perform one or more of the methods disclosed with reference to FIGS. 4-6.

It should be noted that color matching may be beneficial when the image information is being communicated between devices, such as, for example from one copier to another copier or to a computer screen. Accordingly, the color matcher may provide adjustments given the intended output display. In embodiments, the labeled image may be used to perform differential enhancement for viewing or printing of the compressed image. For example, printing often requires higher levels of sharpening for high-quality text than what would be required for viewing on a computer screen. The label information may also be used to switch between printer/screen color tables to improve the rendering of the image or portions thereof, such as non-halftone edges that typically correspond to text on background regions. For example, lower frequency screens may be used over pixels labeled halftone edge or halftone to improve tone stability in devices such as color laser printers and may also provide a greater number of tones.

2. Segmenter

In embodiments, system 100 may comprise a segmenter 110 that receives an image 105 and segments the image into different regions or layers. In embodiments, segmenter 110 may segment the image by labeling the image 105 at the pixel level. In embodiments, each pixel of at least a portion of the image 105 may be assigned a label, such as background or foreground pixel. It shall be noted the number, type, and classification of labels may vary. In embodiments, segmenter 110 may implement one or more of the segmentation methods disclosed in U.S. patent application Ser. No. 11/202,720, filed on Aug. 12, 2005, entitled "LABEL AIDED COPY ENHANCEMENT," by Anoop K. Bhattacharjya; U.S. patent application Ser. No. 11/691,339, filed on Mar. 26, 2007, entitled "SYSTEMS AND METHODS FOR GENERATING BACKGROUND AND FOREGROUND IMAGES FOR DOCUMENT COMPRESSION," by Che-Bin Liu and Anoop K. Bhattacharjya; U.S. patent application Ser. No. 11/691,418, filed on Mar. 26, 2007, entitled "SYSTEMS AND METHODS TO CONVERT IMAGES INTO HIGH-QUALITY COMPRESSED DOCUMENTS," by Che-Bin Liu and Anoop K. Bhattacharjya; U.S. patent application Ser. No. 11/891,781, filed on Aug. 13, 2007, entitled "SEGMENTATION-BASED IMAGE LABELING," by Jing Xiao and Anoop K. Bhattacharjya; and U.S. patent application Ser. No. 11/848,075, filed on Aug. 30, 2007, entitled "FAST SEGMENTATION OF IMAGES," by Che-Bin Liu, each of which is incorporated herein by reference. One skilled in the art shall recognize that segmenter 110 may implement or employ any of a number of segmentation methods. It shall be noted that no particular segmenter 110 or segmentation method is critical to present invention.

3. Background Suppressor

As illustrated in FIG. 1, system 100 may comprise a background suppressor 120 that receives the image segmentation information and suppresses the background according to embodiments of the invention. In embodiments, background suppressor 120 may suppress colors of background pixels by examining pixels in a neighborhood of a background pixel. In embodiments, background suppressor 120 may suppress background pixels by performing one or more of the methods described below in the "Background Suppression" section.

In embodiments, background suppressor 120 may be used for documents with not just text but with images with one or more object types, such as text, images, graphics, line art, or the like. In embodiments, the level of suppression may be adjusted. For example, in embodiments, a text mode, for documents that are exclusively or predominantly text, may be selected. Alternatively, a photo mode, for documents that contain photos, may be selected. One skilled in the art shall recognize that other modes may be used.

4. Post Processor

In embodiments, an output of the background suppressor 120 may be a refined segmented image. One skilled in the art shall recognize that having obtained image segments or layers, any of a number of post-processing operations may be performed and that none of these operations are critical to the present invention. In embodiments, the segmented image may undergo additional processing, such as image enhancement, compression, format conversion, watermarking, special effects, video editing, etc. These and other applications or processes may be considered post-processing operations and may be performed or alternatively included within a system, such as system 100. Another application that may use the segmented image information, and which may be included within system 100, is document compression.

a) Compression and Composite Generator

In an embodiment, system 100, or portions thereof, may be used to help generate compressed images or documents. The compressed document may represent a composite of compressed segmented image layers and may have enhanced visual quality and much smaller file size. In an embodiment, the resulting compression document may be in a portable document format ("PDF"), but one skilled in the art shall recognize that other viewers and formats may be employed.

In embodiments, the background and foreground image layers may be compressed using one or more compression algorithms. In embodiments, a JPEG compression with the same or different compression ratios may be used to compress the background and foreground image layers.

In embodiments, the composite of two compressed image layers (foreground and background) may be achieved by maintaining an image mask that identifies foreground pixels. In embodiments, this mask may be kept intact with lossless compression, such as JBIG2, to minimize file size. In embodiments, the foreground and background image layers may be downsampled, such as, for example, by a ratio of 3:1, and the mask may be maintained at a ratio of 1:1. In embodiments, system 100 may include a downsampler (not shown) to downsample the foreground and/or background image layers.

B. Method Embodiments

Figure 3:
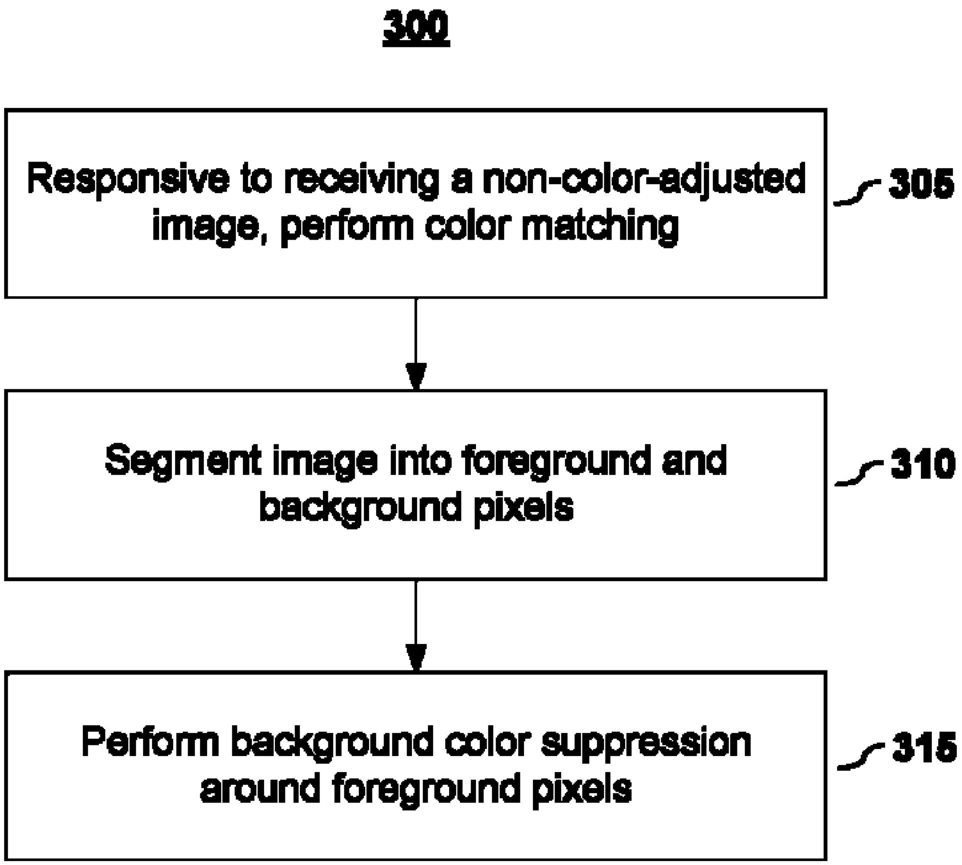
FIG. 3 illustrates a method for suppressing the background of an image according to embodiments of the invention.

FIG. 3 illustrates a method 300 for suppressing the background of an image according to embodiments of the invention. As depicted in FIG. 3, responsive to having a non-color-adjusted image, a received image may undergo color matching (305). As noted previously, color adjustment can be beneficial for a number of reasons, including but not limited to, adjusting the image to better match the original image, to improve the appearance of the displayed image, and to adjust it for an intended display device.

1. Color Matching

In embodiments, the input image may be matched (305) using the right color profile to achieve better color distribution. In an embodiment, a scanner may be used to create a digital version of a hard copy document, that is, a physical medium, e.g., paper document. Other devices, such as a printer, copier, camera, or facsimile machine may also be used to generate a digital version of a physical document. The term "scanned document" is used herein to refer to a digital document generated from a physical document by any of these or other known means. In an embodiment, the scanned document, which is typically captured in RGB color space, may be converted into a device-independent perceptually-uniform color space. In an embodiment, this conversion may employ a color profile of the scanner and a white point reference color, which information may be supplied by a look-up table.

In embodiments, given a scanner, printer, copier, or display color profile, the colors of the image, or one or more layers derived from the image, may be adjusted so that the image colors more closely match the original document. As noted previously, color matching may also be beneficial when the image information is being communicated between devices, such as, for example from one copier to another copier or to a computer screen. Accordingly, the color matching may provide adjustments given the intended output display.

Figure 4:
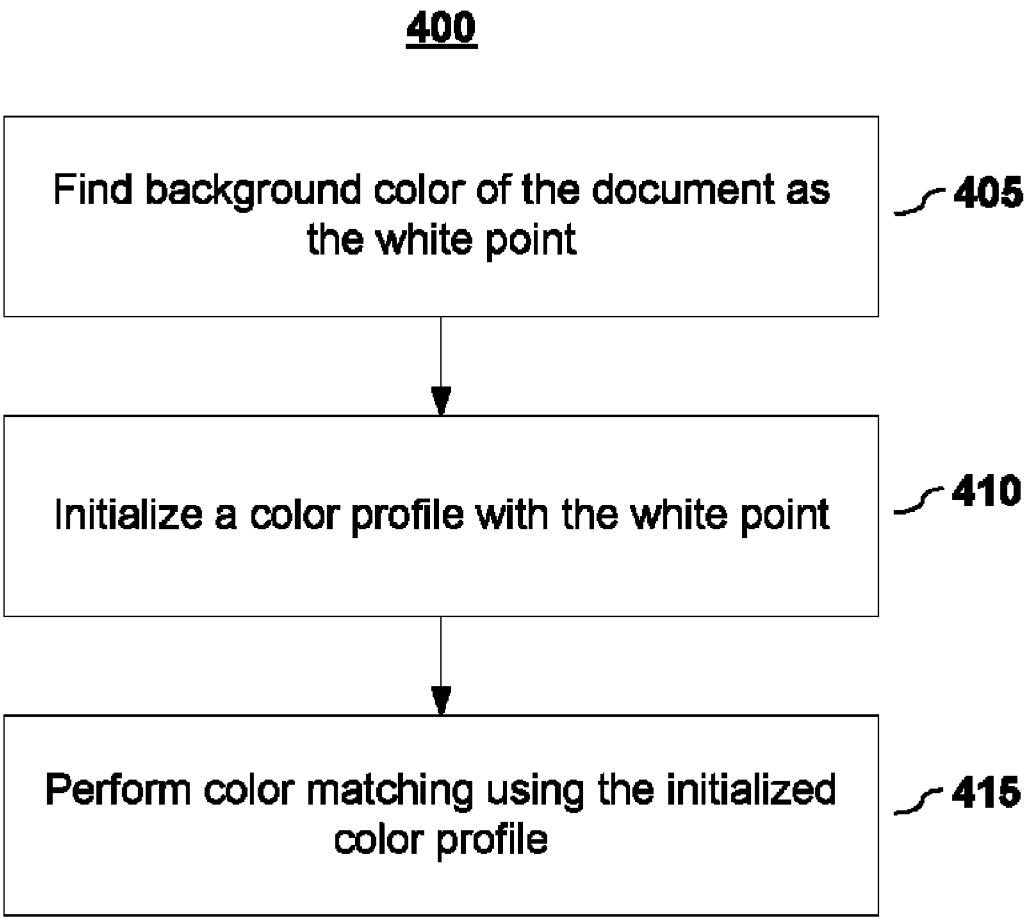
FIG. 4 illustrates a method for performing color matching according to embodiments of the invention.

FIG. 4 illustrates a method 400 for performing color matching according to embodiments of the invention. As depicted in FIG. 4, a background color of the image may be identified (405) as a "white point." Using the identified white point, a color profile or color table may be initialized (410). For example, in an embodiment, the color space may be transformed using the white point color as the origin for the initialized or transformed color space. Having obtained the initialized color space, the image may be color adjusted by performing (415) color matching using the initialized color profile.

Figure 5:
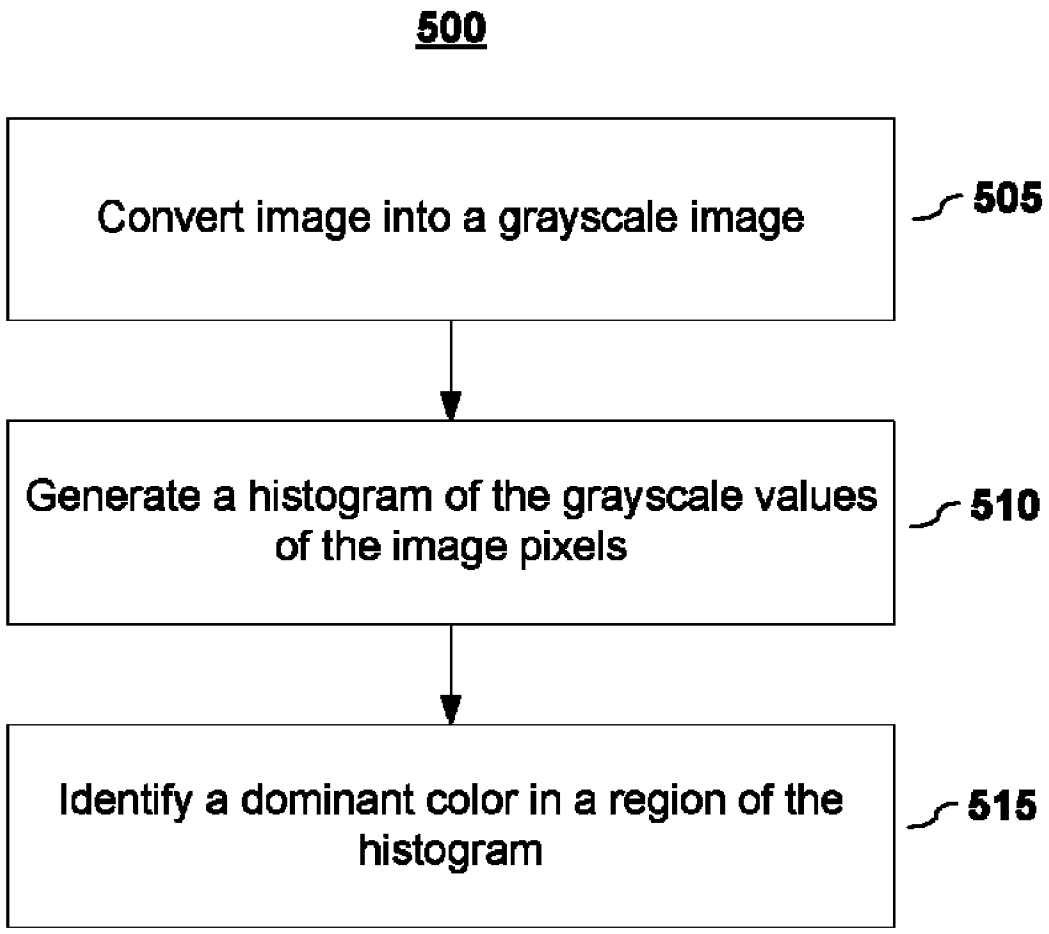
FIG. 5 depicts a method for identifying a white point according to embodiments of the invention.
Figure 6:
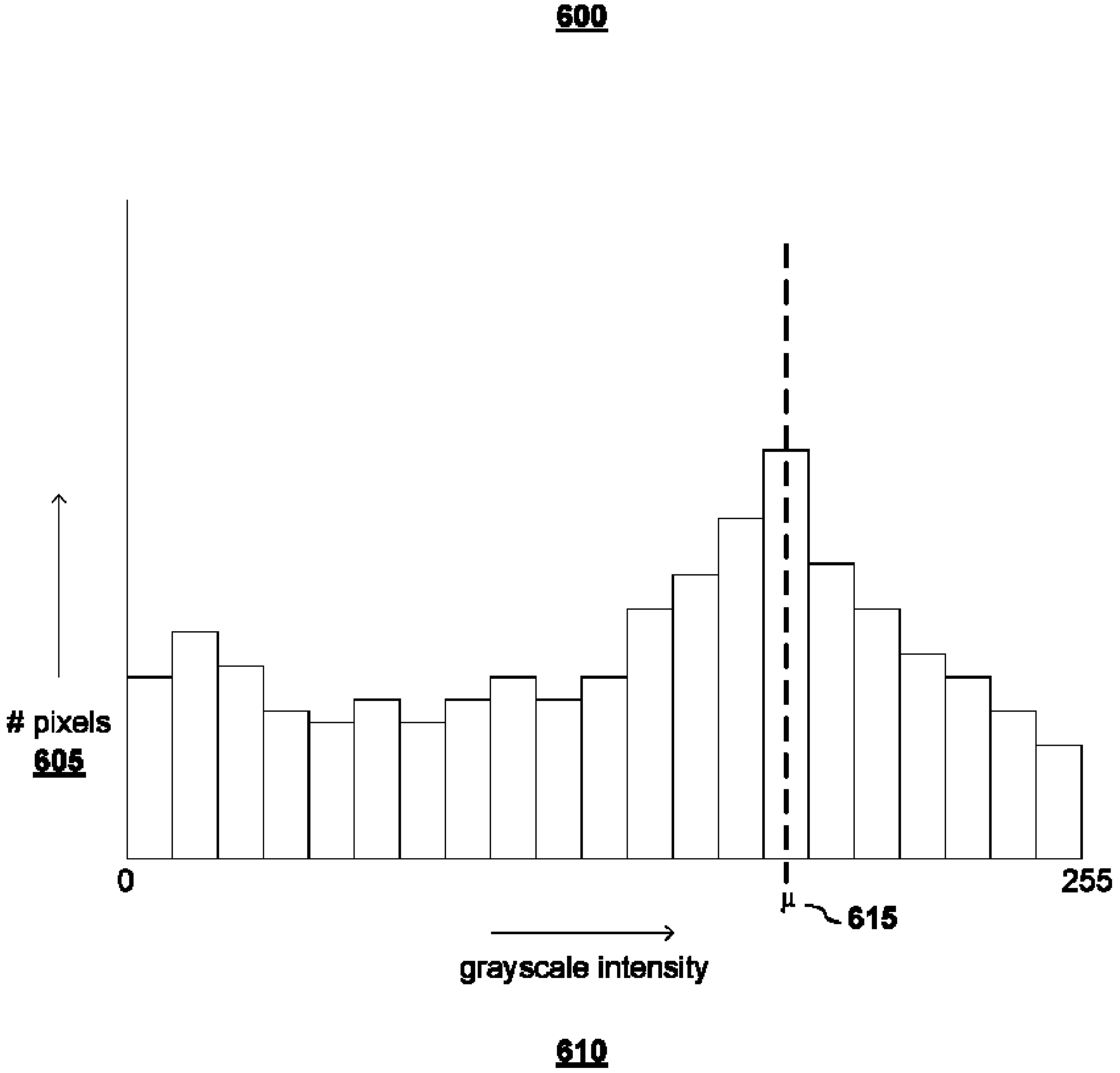
FIG. 6 graphically illustrates a method a method for identifying a white point according to embodiments of the invention.

FIG. 5 depicts a method 500 for identifying a white point according to an embodiment of the invention. In an embodiment, the image, if it is not a grayscale image, may be converted (505) into a grayscale image, and a histogram of the pixels' grayscale values may be generated (510). FIG. 6 illustrates an example of a histogram 600 of the grayscale intensity values 610 of pixels 605 in an image according to various embodiments. In embodiments, an analysis of the histogram identifies (515) a dominant background color $\mu$ (615). In the depicted example, the dominant background color is the brightest color shared by the largest group of pixels. In embodiments, the dominant background color may be the average (mean, median, or mode) of pixel values in a region of the histogram. In embodiments, the dominant background color may be used to compute a "background color threshold" value. For example, in embodiments, a background color threshold value may be defined to be $\mu$-$\sigma$ (620), where $\sigma$ represents a threshold value. In various embodiments, $\sigma$ may function like or be related to the variance of background intensity. In embodiments, a pixel may be labeled as a background pixel if its intensity is greater than the background color threshold value. A background mask may comprise the set of labeled background pixels in the image.

One skilled in the art will recognize that a number of different methods of color adjusting exist and may be utilized. Furthermore, it shall be noted that no particular color adjusting method is critical to the present invention.

2. Segmentation

Returning to FIG. 3, the image may be segmented (310) into different layers. In embodiments, each pixel of at least a portion of the image may be assigned a label, such as background or foreground pixel. It shall be noted the number, type, and classification of labels may vary. In embodiments, one or more of the segmentation methods disclosed in the following patent applications may be used: U.S. patent application Ser. No. 11/202,720, filed on Aug. 12, 2005, entitled "LABEL AIDED COPY ENHANCEMENT," by Anoop K. Bhattacharjya; U.S. patent application Ser. No. 11/691,339, filed on Mar. 26, 2007, entitled "SYSTEMS AND METHODS FOR GENERATING BACKGROUND AND FOREGROUND IMAGES FOR DOCUMENT COMPRESSION," by Che-Bin Liu and Anoop K. Bhattacharjya; U.S. patent application Ser. No. 11/691,418, filed on Mar. 26, 2007, entitled "SYSTEMS AND METHODS TO CONVERT IMAGES INTO HIGH-QUALITY COMPRESSED DOCUMENTS," by Che-Bin Liu and Anoop K. Bhattacharjya; U.S. patent application Ser. No. 11/891,781, filed on Aug. 13, 2007, entitled "SEGMENTATION-BASED IMAGE LABELING," by Jing Xiao and Anoop K. Bhattacharjya; and U.S. patent application Ser. No. 11/848,075, filed on Aug. 30, 2007, entitled "FAST SEGMENTATION OF IMAGES," by Che-Bin Liu, each of which is incorporated herein by reference. One skilled in the art shall recognize that any of a number of segmentation methods may be employed, and that no particular segmentation method is critical to present invention. Following labeling/segmentation, the foreground pixels may be referred to herein as the foreground mask.

3. Background Suppression

Figure 7:
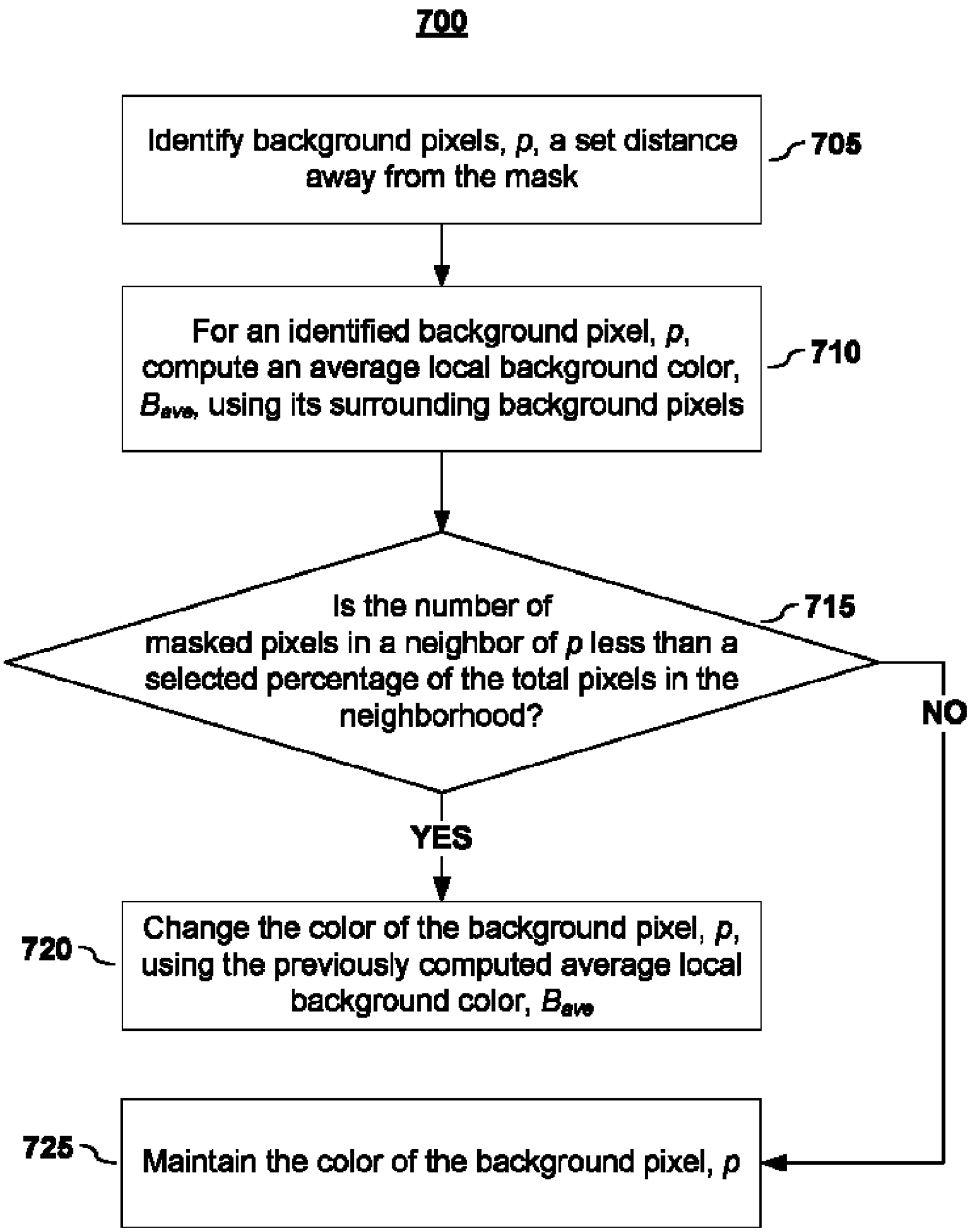
FIG. 7 depicts a method for suppressing the background of an image according to embodiments of the invention.

To improve the appearance of the segmented image, background suppression may be performed (315) on the segmented image. FIG. 7 depicts a method for suppressing the background around foreground pixels according to embodiments of the invention.

As illustrated in FIG. 7, the background pixels that are a set distance from the foreground mask are identified (705). In embodiments, the set distance may be two pixels. For an identified background pixels (denoted herein as p), an average (mean, median, or mode) local background color, $B_{ave}$, may be computed (710) using the background pixels within a local region of the background pixel, p. In embodiments, the average color calculation may be limited to the non-p background pixels in the local region. In embodiments, the local region may be a 5-by-5 region centered at the identified background pixel, p, although one skilled in the art will recognize that other sized or configured local regions may be used.

As illustrated in FIG. 7, a determination is made (715) whether the number of masked pixels (that is, foreground pixels) in a neighborhood of the identified background pixel, p, is less than a selected percentage of the total pixels in the neighborhood. In embodiments, the neighborhood may be a 7-by-7 region centered at the identified background pixel, p, although one skilled in the art will recognize that other sized or configured local regions may be used.

If the number of masked pixels is less than a threshold percentage multiplied by the total pixels in the neighborhood, the color of the identified background pixel, p, may be changed (720) to the previously computed average local background color, $B_{ave}$. Otherwise, the color of the identified background pixel, p, may remain unchanged (725). The following formula depicts an embodiment of the background suppression determination:

$$Cp = \begin{cases} B_{ave}, & \text{when } N_{masked} < A \times T \\ Cp, & \text{otherwise.} \end{cases}$$

where Cp represents the color of the identified background pixel, p; $B_{ave}$ represents the previously computed average local background color; $N_{masked}$ represents the number of masked pixels in a neighborhood of the identified background pixel; A represents the threshold percentage; and T represents the total number of pixels in the selected neighborhood of the identified background pixel.

It should be noted that threshold percentage, A, of the previous step affects the aggressiveness level of background color suppression. For example, in embodiments, if the threshold percentage is set at 100, the color of the identified background pixel, p, may be modified immediately—even without performing determination step (715). In an embodiment, if the threshold percentage is set zero (0), the background color suppression process may be ignored. One skilled in the art shall recognize that the aggressiveness threshold percentage may be adjusted for different image content types or different modes. For example, for a text mode, the percentage may be set low to modify background color around foreground very aggressively. Alternatively, for a photo mode, the percentage may be set high. And furthermore, in embodiments, for documents with mixed types, a mid-range value, such as 75, may be set. In embodiments, the mode or aggressiveness percentage may be preset, user selected, and/or automatically selected based upon examination of the image, such as the segmentation results.

In alternative embodiments, the determination (715) may be based upon examination of the number of background pixels. For example, if the number of background pixels is greater than a selected percentage of the total number of pixels in the neighborhood, the color of the identified background pixel may be changed to the previously computed average local background color.

As with the previous embodiments, the selected percentage affects the aggressiveness level of the background color suppression. For example, in embodiments, if the threshold percentage is set at zero (0), the color of the identified background pixel, p, may be modified immediately—even without performing a determination step. In embodiments, if the threshold percentage is set 100, the background color suppression process may be ignored. One skilled in the art shall recognize that the aggressiveness threshold percentage may be adjusted for different image content types or different modes. For example, in embodiments, for documents with mixed types, a mid-range value, such as 25, may be set.

4. Sample Results

Figure 8:
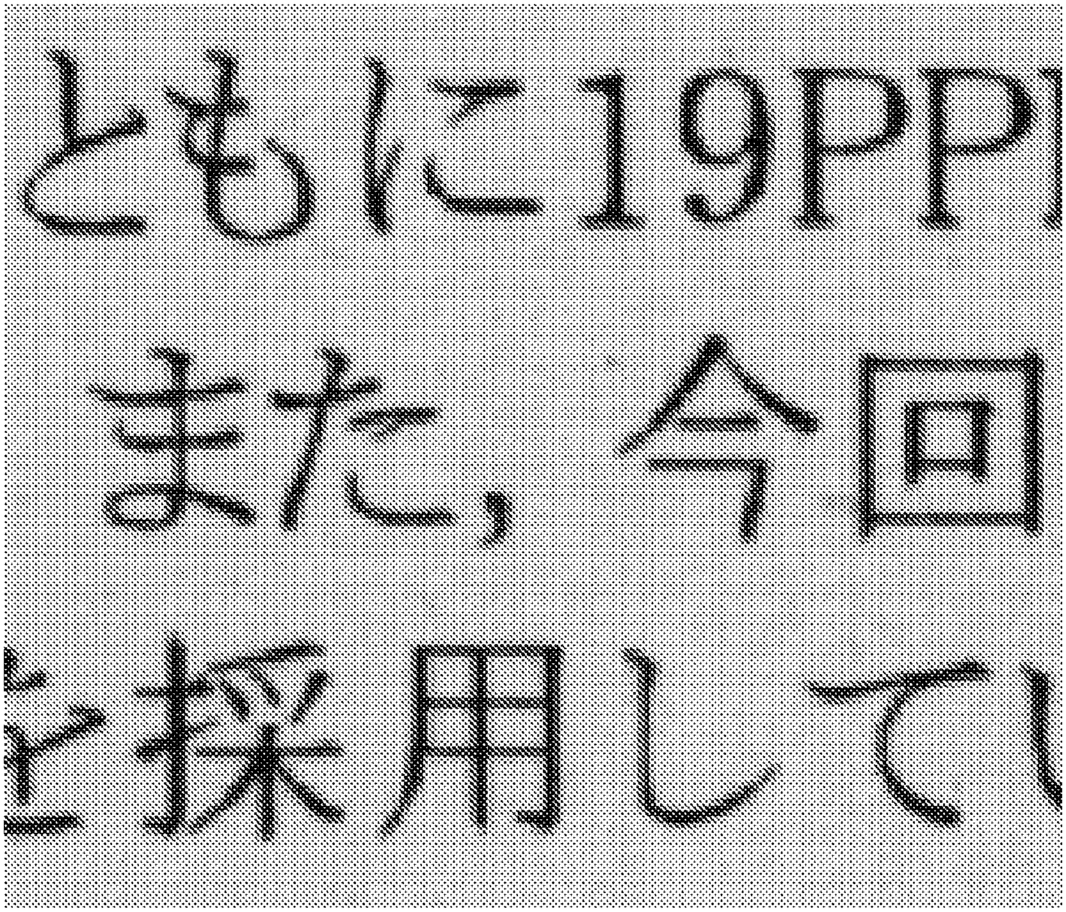
FIG. 8 depicts an example of an input image according to an embodiment of the invention.
Figure 9:
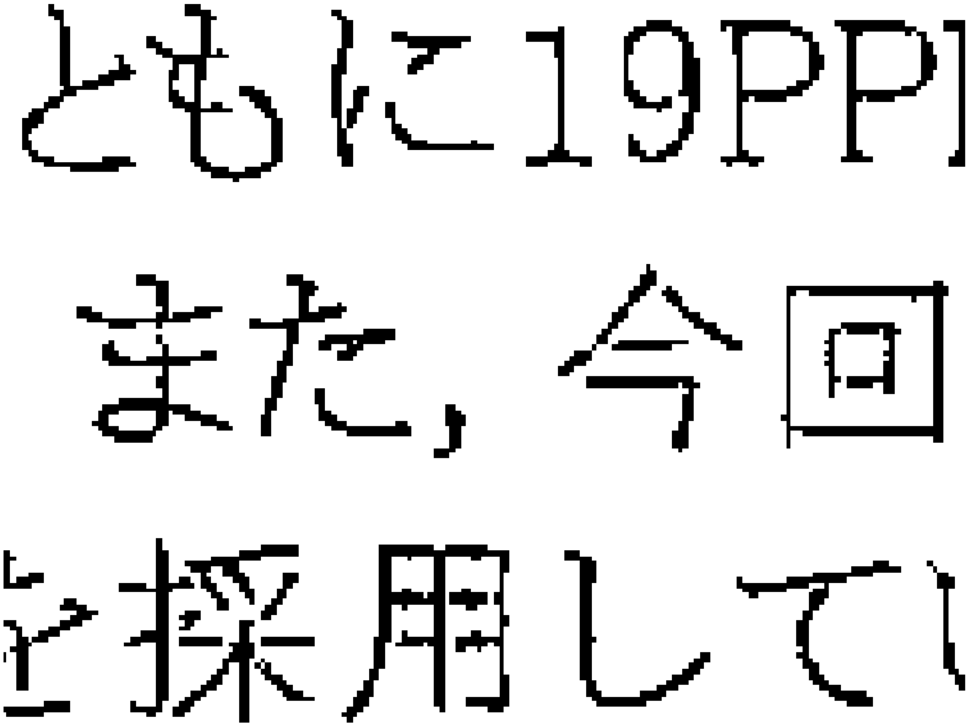
FIG. 9 depicts an example of a foreground mask for the input image according to an embodiment of the invention.

FIGS. 8-11 depict sample results of an image according to embodiments of the invention. FIG. 8 depicts an example of an input image 800 according to an embodiment of the invention. The original image 800 contains gray background, which may depend on the scanner sensors. FIG. 9 depicts an example of a foreground mask 900 for the input image of FIG. 8 according to an embodiment of the invention. The mask 900 binarizes the document 800 and separate pixels of the image into foreground/background layers.

Figure 10:
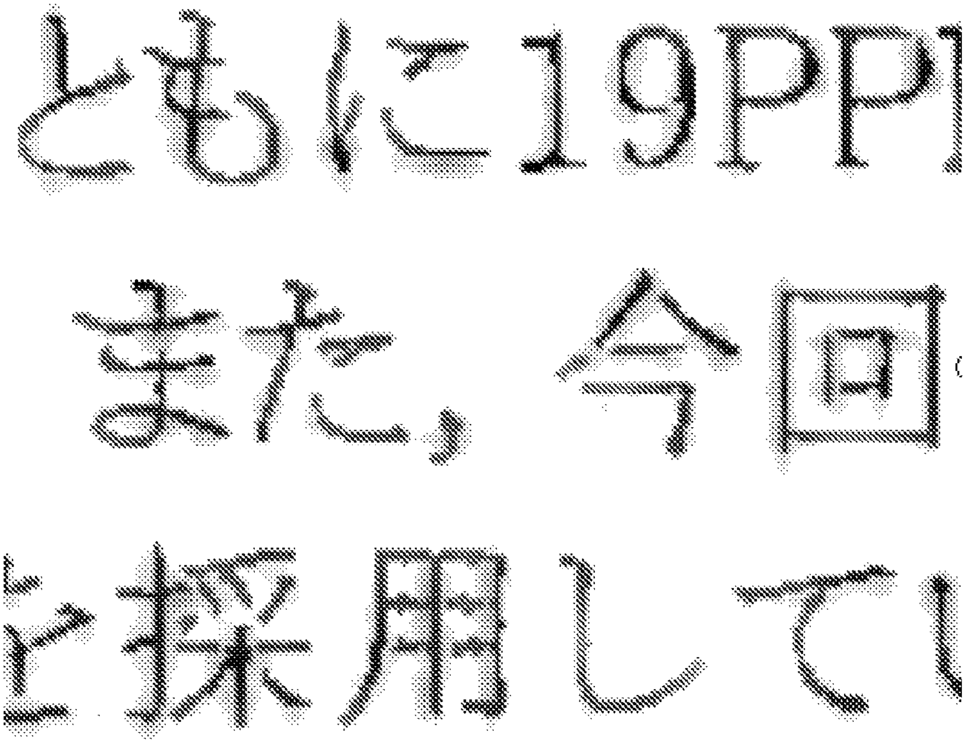
FIG. 10 depicts an example of a processed image that has not had its background suppressed.
Figure 11:
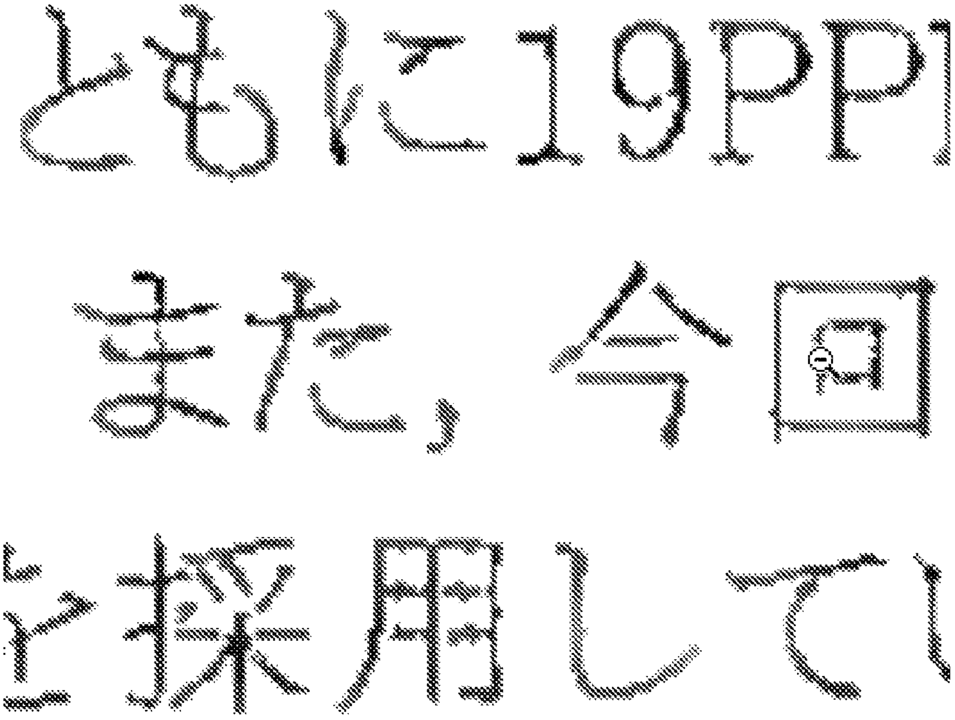
FIG. 11 depicts an example of a processed image that has had its background suppressed according to an embodiment of the invention.

FIG. 10 depicts an example of a processed image 1000 of image 800 that has not had its background suppressed. FIG. 11 depicts an example of a processed image 1100 of image 800 that has had its background suppressed according to an embodiment of the invention. In an embodiment, the processed images 1000, 1100 may be compressed documents.

A comparison of the two processed images illustrates the suppressed background of image 1100 in FIG. 11 has a cleaner, more visually appealing appearance than that of the image 1000 in FIG. 10. In embodiments, when the colors of pixels are modified into local background color, the compressed document looks clean around text and has better readability. Otherwise, non-background colors (e.g., grayish colors) tends to spread due to background compression algorithms.

It should be noted that embodiments of the systems disclosed herein may perform one or more of the embodiments of the methods disclosed herein. However, it will be noted that the methods disclosed herein are not limited to application with the disclosed systems.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A method for suppressing background pixels of an image comprising pixels, the method comprising:

generating a foreground mask corresponding to pixels that have been identified as foreground pixels in the image;

identifying background pixels within a first distance from the foreground mask;

for an identified background pixel:

responsive to a number of foreground pixels within a first neighborhood of the identified background pixel being less than a threshold percentage multiplied by a total number of pixels in the first neighborhood, changing the identified background pixel's color to an average local background color wherein the method is implemented by using one or more processors.

2. The method of claim 1 wherein the average local background color is obtained by:

computing an average color of background pixels that are not background pixels within the first distance from the foreground mask and are background pixels within a second neighborhood of the identified background pixel.

3. The method of claim 1 further comprising:

responsive to the image being a non-color-adjusted image, color adjusting the image.

4. The method of claim 3 wherein the step of color adjusting the image comprises:

identifying a background color of the image as a white point;

initializing a color profile with the white point; and performing color matching for at least some of the pixel in the image using the color profile.

5. The method of claim 1 further comprising the step of:

applying post-processing to at least some of the foreground or background pixels.

6. The method of claim 5 wherein the step of applying post-processing comprises obtaining a compressed version of the image.

7. The method of claim 6 wherein the compressed version of the image is in a portable format document.

8. A non-transitory computer-readable medium comprising one or more sequences of instructions to direct an instruction-executing device to perform at least the steps of claim 1.

9. A system for suppressing background of an image, the system comprising:

a background suppressor, embodied at least in part in one or more processors and coupled to receive an image comprising foreground pixels and background pixels, that identifies at least some of the background pixels within a first distance from a foreground pixel in the image, and that, for an identified background pixel, changes the identified background pixel's color to an average local background color responsive to a number of foreground pixels within a first neighborhood of the identified background pixel being less than a threshold percentage multiplied by a total number of pixels in the first neighborhood.

10. The system of claim 9 wherein the average local background color is obtained by:

computing an average color of background pixels that are not background pixels within the first distance from the foreground mask and are background pixels within a second neighborhood of the identified background pixel.

11. The system of claim 9 further comprising:

a segmenter, coupled to receive an image comprising pixels, that assigns a foreground or a background label to at least some of the pixels.

12. The system of claim 9 further comprising:

a color adjustor, coupled to receive the image, that color adjusts the image responsive to the image being a non-color-adjusted image.

13. The system of claim 12 wherein the color adjustor color adjusts the image responsive to the image being a non-color-adjusted image by performing the steps comprising:

identifying a background color of the image as a white point;

initializing a color profile with the white point; and performing color matching for at least some of the pixel in the image using the color profile.

14. The system of claim 9 further comprising:

a post processor, coupled to receive at least some of the foreground or background pixels, that applies one or more post-processing operations to at least some of the foreground or background pixels.

15. The system of claim 14 wherein the one or more post-processing operations comprises obtaining a compressed version of the image.

16. The system of claim 15 wherein the compressed version of the image is in a portable format document.

17. A method for suppressing background pixels of an image comprising foreground and background pixels, the method comprising:

identifying background pixels within a first distance from a foreground pixel;

for an identified background pixel:

responsive to a number of background pixels within a first neighborhood of the identified background pixel being greater than a threshold percentage multiplied by a total number of pixels in the first neighborhood, changing the identified background pixel's color to an average local background color;

wherein the method is implemented by using one or more processors.

18. The method of claim 17 wherein the average local background color is obtained by:

computing an average color of background pixels that are not background pixels within the first distance from a foreground pixel and are background pixels within a second neighborhood of the identified background pixel.

19. The method of claim 17 further comprising the step of:

applying post-processing to at least some of the foreground or background pixels.

20. A non-transitory computer-readable medium comprising one or more sequences of instructions to direct an instruction-executing device to perform at least the steps of claim 17.

* * * * *